United States Patent
Takahashi et al.

(10) Patent No.: US 8,204,364 B2
(45) Date of Patent: Jun. 19, 2012

(54) MOVING PICTURE IMAGE REPRODUCTION METHOD AND MOVING PICTURE IMAGE REPRODUCTION APPARATUS

(75) Inventors: Maki Takahashi, Hiroshima (JP); Shuichi Watanabe, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1404 days.

(21) Appl. No.: 11/793,368

(22) PCT Filed: Dec. 12, 2005

(86) PCT No.: PCT/JP2005/022748
§ 371 (c)(1), (2), (4) Date: Jun. 15, 2007

(87) PCT Pub. No.: WO2006/064749
PCT Pub. Date: Jun. 22, 2006

(65) Prior Publication Data
US 2008/0069516 A1    Mar. 20, 2008

(30) Foreign Application Priority Data
Dec. 16, 2004    (JP) .................................. 2004-364940

(51) Int. Cl.
G11B 27/00 (2006.01)
H04N 5/93 (2006.01)

(52) U.S. Cl. .................. 386/278; 386/343; 386/E5.052; 375/E7.027

(58) Field of Classification Search .................. 386/278, 386/343, E5.052; 375/E7.027
See application file for complete search history.

(56) References Cited

U.S. PATENT DOCUMENTS

| | | | | |
|---|---|---|---|---|
| 6,760,536 | B1 * | 7/2004 | Amir et al. | 386/344 |
| 7,075,683 | B1 | 7/2006 | Shiiyama | |
| 2002/0136528 | A1 | 9/2002 | Dagtas | |
| 2003/0002853 | A1 | 1/2003 | Hori et al. | |
| 2005/0207733 | A1 * | 9/2005 | Gargi | 386/68 |

FOREIGN PATENT DOCUMENTS

| | | |
|---|---|---|
| EP | 1 174 879 | 1/2002 |
| JP | 3-177175 | 8/1991 |
| JP | 4-237284 | 8/1992 |
| JP | 8-251540 | 9/1996 |
| JP | 8-298646 | 11/1996 |
| JP | 2000-235638 | 8/2000 |

* cited by examiner

Primary Examiner — Thai Tran
Assistant Examiner — Girumsew Wendmagegn
(74) Attorney, Agent, or Firm — George W. Neuner; Edwards Wildman Palmer LLP

(57) ABSTRACT

According to a conventional technique for reproducing a frame of a small image change amount at a high speed and a frame of a large image change amount at a low speed, there are cases in which a proper high-speed reproduction representing the outline of the moving picture image data is not necessarily carried out. There is provided reproduction speed control means controlling the reproduction speed of summary reproduction based on a scene feature amount of a plurality of frames. A plurality of summary reproductions having different reproduction characteristics are enabled so that a user can easily grasp the outline of the moving picture image data, while suppressing fluctuation in reproduction speed.

6 Claims, 12 Drawing Sheets

A COLOR COMPONENT RATIO a: 50% (40/80 PIXELS)
b: 40% (32/80 PIXELS)
c: 10% ( 8/80 PIXELS)

B REPRESENTATIVE COLOR a:

(a) STRUCTURAL EXAMPLE ENABLING MULTISTEP REPRODUCTION SPEED SWITCHING (b) STRUCTURAL EXAMPLE ENABLING CONTINUOUS REPRODUCTION SPEED SWITCHING (c) STRUCTURAL EXAMPLE USING DIFFERENT CONDITIONS DEPENDING ON $x_{i-1}, s_{i-1}$ (a) STRUCTURAL EXAMPLE ENABLING MULTISTEP REPRODUCTION SPEED SWITCHING (b) STRUCTURAL EXAMPLE ENABLING CONTINUOUS REPRODUCTION SPEED SWITCHING (c) STRUCTURAL EXAMPLE USING DIFFERENT CONDITIONS DEPENDING ON $x_{i-1}, s_{i-1}$

MOVING PICTURE IMAGE REPRODUCTION METHOD AND MOVING PICTURE IMAGE REPRODUCTION APPARATUS

TECHNICAL FIELD

The present invention relates to a method for reproducing the summary of moving picture image data and to an apparatus for reproducing a moving picture image having a summary reproduction function.

BACKGROUND ART

Patent Document 1 describes a conventional technology for realizing a high-speed reproduction in accordance with the content of moving picture image data. In this technology, a reproduction speed is controlled for each frame, based on a picture image feature amount associated with the moving picture image data to be reproduced for each frame.

In the following description, an amount of change in picture image between a frame i–1 and a frame i shown in the following Formula 1 (magnitude in difference between frames) is used as a picture image feature amount $x_i$ with respect to the frame i.

$$x_i = \sum_{v=0}^{v<H} \sum_{u=0}^{u<W} |p_i(u, v) - p_{i-1}(u, v)| \qquad \text{Formula 1}$$

In the above Formula 1, $p_i(u, v)$ represents a pixel value of the coordinates (u, v) of the frame i, W represents a frame width, and H represents a frame height.

The flow of a reproduction operation in accordance with the above technology will be described hereafter with reference to a flowchart diagram shown in FIG. 12. First, the picture image feature amount $x_i$ with respect to the frame i is compared with a predetermined threshold value $TH_1$ (step S001). If $x_i \leq TH_1$, the reproduction speed $s_i$ of the frame i is set to be $s_i = S_1$ (step S002). On the other hand, if $x_i > TH_1$, the reproduction speed $s_i$ of the frame i is set to be $s_i = S_2$ (step S003).

Note that the relationship between $S_1$ and $S_2$ is $S_1 > S_2$.

Next, the frame i is reproduced in accordance with the determined reproduction speed $s_i$ (step S004), and each of the above steps S001 to S004 is repeated with respect to all the frames (step S005). In this way, a high-speed reproduction processing is enabled.

As described above, in accordance with the technology described in Patent Document 1, a reproduction is carried out at a high speed when a picture image change amount between frames is small, and a reproduction is carried out at a low speed when a picture image change amount between frames is large, so as to realize a high-speed reproduction in accordance with the change of the picture image feature amount in the moving picture image data.

Patent Document 1: JP Patent Publication (Kokai) No. 8-298646 A (1996)

DISCLOSURE OF THE INVENTION

Problems to be Solved by the Invention

The moving picture image reproduction apparatus using the reproduction method described in the above Patent Document 1 provides a high-speed reproductions by reproducing a frame having a small picture image change amount at a high speed and reproducing a frame having a large picture image change amount at a low speed, so that a user can easily grasp the change of the picture image in moving picture image data. However, there are cases in which such method is not necessarily an appropriate high-speed reproduction (hereafter referred to as a "summary reproduction") for representing the outline of moving picture image data.

For example, when the content of the moving picture image data to be reproduced is a drama or the like, there are cases in which exchange of a conversation between characters is important in order to grasp the outline of the story. However, since a picture image change amount between frames is generally small in such scene, the scene is reproduced at a high speed in accordance with the technology. It is therefore difficult to grasp the contents of the moving picture image data.

Further, since the reproduction speed of the frame i is determined based on the picture image feature amount $x_i$, in the case of moving picture image data in which $x_i$ greatly fluctuates in a short period of time, the reproduction speed is also caused to greatly fluctuate for each frame. Thus, the technology is also problematic in that the motion of the picture image to be reproduced tends to look unnatural.

Means of Solving the Problems

One aspect of the present invention provides a moving picture image reproduction method having a reproduction speed control step of determining a reproduction speed of moving picture image data, the step determining the reproduction speed of moving picture image data, based on one or more kinds of feature amount associated with the moving picture image data. It is preferable that the feature amount be extracted from the moving picture image data. The reproduction speed control step has a plurality of reproduction speed control conditions for each of one or more kinds of feature amount, and the reproduction speed control step changes the reproduction speed control conditions based on instructions from the outside. In this way, even when the feature amount greatly fluctuates, a suitable summary reproduction can be realized while suppressing change in reproduction speed between frames to the minimum.

Another aspect of the present invention provides a moving picture image reproduction apparatus having a reproduction speed control means for determining a reproduction speed of moving picture image data, the reproduction speed control means determining the reproduction speed based on one or more kinds of feature amount associated with the moving picture image data. The feature amount is extracted from the moving picture image data. The reproduction speed control means has a plurality of reproduction speed control conditions with respect to one or more kinds of feature amount, and the reproduction speed control means has means for changing the reproduction speed control conditions based on instructions from the outside.

Another aspect of the present invention provides a moving picture image reproduction apparatus comprising means for providing a plurality of summary reproduction methods having different reproduction characteristics based on a scene feature amount for each scene in moving picture image data. It is preferable that the apparatus has means for setting the number of frames that constitute the scene in advance.

Note that the above moving picture image reproduction apparatus is characterized in that it reproduces the summary of moving picture image data.

Effects of the Invention

In accordance with the moving picture image reproduction method and the moving picture image reproduction apparatus of the present invention, since a plurality of summary reproduction methods are provided based on one or more kinds of feature amount, a summary reproduction in accordance with a user request is enabled.

Further, even when the feature amount greatly fluctuates for each frame, a suitable summary reproduction can be realized while suppressing change in reproduction speed between frames to the minimum.

EXPLANATION OF LETTERS OR NUMERALS

1 . . . picture image decoding unit, 2 . . . reproduction unit, 3 . . . reproduction speed control unit, 4 . . . picture image analysis unit.

BEST MODES FOR CARRYING OUT THE INVENTION

Figure 2:
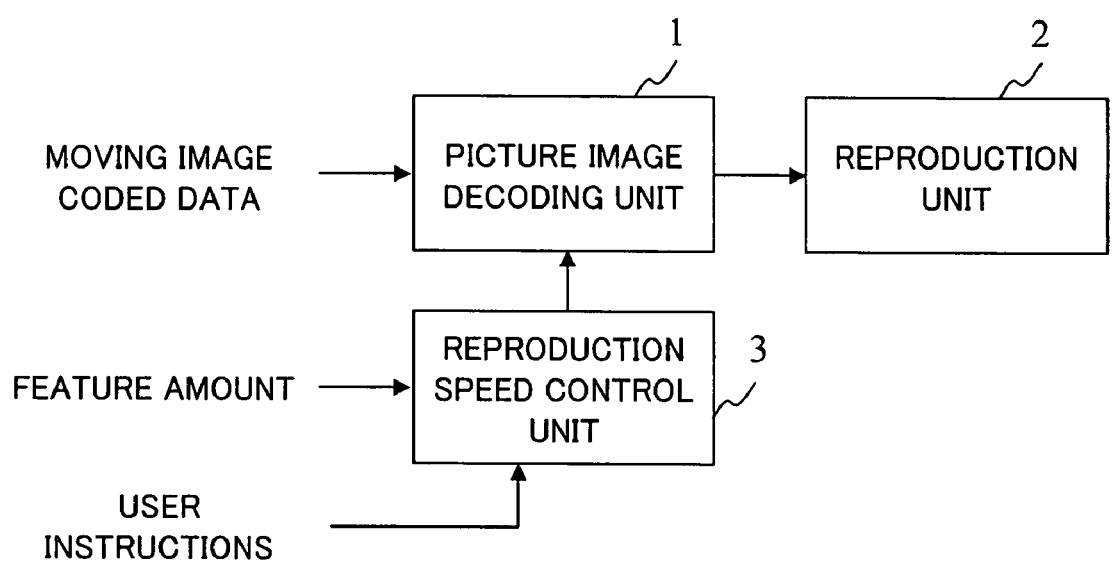
FIG. 2 shows a functional block diagram of an example of the structure of the moving picture image reproduction apparatus according to the embodiment of the present invention.

First, a first embodiment of the present invention will be described with reference to the drawings. FIG. 2 is a functional block diagram schematically showing a structural example of a moving picture image reproduction apparatus according to the first embodiment of the present invention. In FIG. 2, reference numeral 1 denotes a picture image decoding unit for decoding moving picture image coded data and outputting a decoded image in accordance with a predetermined reproduction speed, reference numeral 2 denotes a reproduction unit for displaying the decoded image, and reference numeral 3 denotes a reproduction speed control unit that follows user instructions from the outside for controlling a reproduction speed in accordance with a user's desired summary reproduction method, based on a feature amount associated with the moving picture image data to be reproduced, when the user gives instructions to reproduce the summary.

The moving picture image reproduction apparatus according to the present embodiment is characterized in that moving picture image data is divided into a predetermined number of frames or a predetermined amount of time and the divided data is used as a unit of processing (scene). In the following description, explanation will be made, assuming one scene is composed of moving picture image data composed of a predetermined number $N_1$ of frames. Based on the moving picture image reproduction apparatus of FIG. 2, as a feature amount of moving picture image data, a scene feature amount $x_i$ corresponding to a scene i is inputted to the reproduction speed control unit 3, and a reproduction speed $s_i$ of the scene i is then determined.

Figure 3:
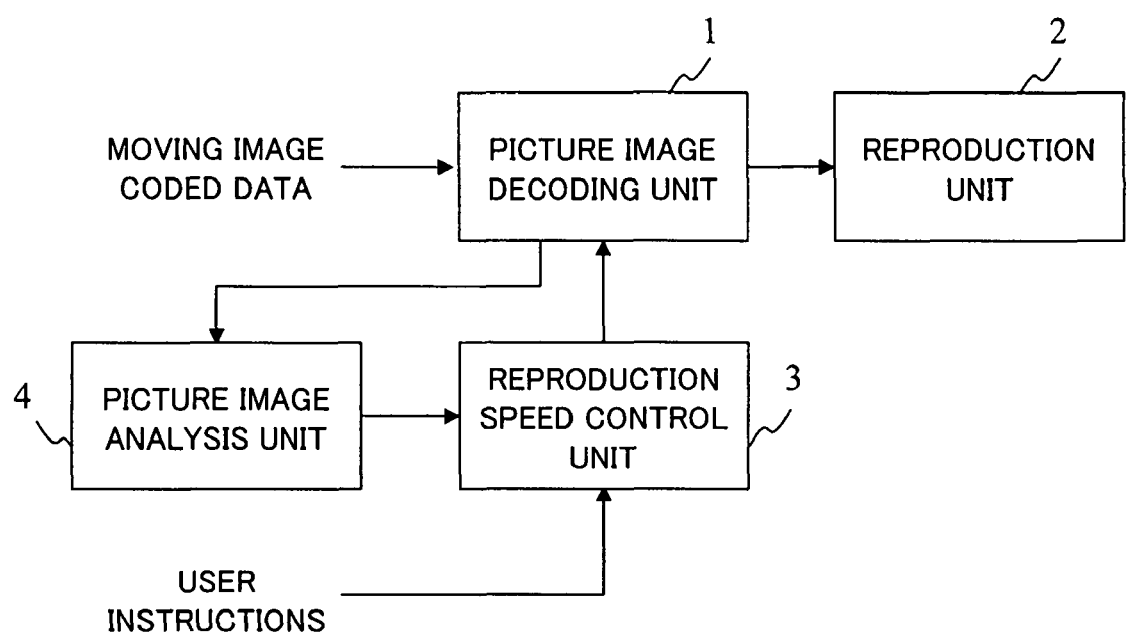
FIG. 3 shows a functional block diagram of an example of the structure of the moving picture image reproduction apparatus according to the embodiment of the present invention, the structure being different from FIG. 2.

Further, in FIG. 2, the scene feature amount may be recorded in an external memory unit (not shown), together with the moving picture image coded data. Alternatively, a feature analysis for each scene may be conducted on the moving picture image coded data in advance, so that the scene feature amount $x_i$ thus obtained is recorded in an external memory unit. Alternatively, as shown in FIG. 3, a picture image analysis unit 4 for performing a feature analysis based on an output from the picture image decoding unit 1 may be provided, so that moving picture image data is sequentially analyzed during reproduction and the analysis result is then used as the scene feature amount.

The scene feature amount used in the moving picture image reproduction apparatus according to the present embodiment will be described in the following. The scene feature amount can be determined directly or indirectly based on the moving picture image data that constitutes a scene. For example, examples of the scene feature amount that can be calculated directly based on the moving picture image data include "color component ratio," "representative color (the color that appears the most frequently), "frequency component distribution of a pattern (texture)" in the moving picture image data in the scene.

Figure 4:
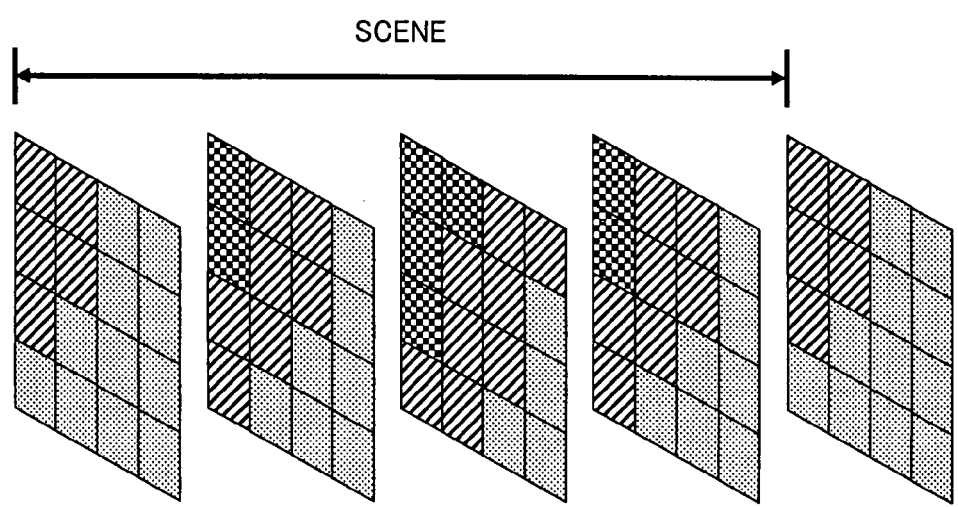
FIG. 4 shows a determination method (B) for determining a color component ratio (A) and a representative color as scene feature amounts according to the embodiment of the present invention.
Figure 4:

FIG. 4 shows an example in which the color component ratio (FIG. 4A) and the representative color (FIG. 4B) in a scene shown in the figure are determined, assuming that a moving picture image is composed of three colors of a, b, and c and when one frame is composed of 16 pixels of 4×4. While both the number of colors and the number of pixels are much greater in an actual moving picture image than the example shown in FIG. 4, the basic principle of the calculation method is the same. Note that the color component ratio and the representative color can be determined by limiting the number of colors through a suitable quantization.

Further, while an example of the scene feature amount that can be obtained indirectly is a "picture image change amount," as in the case of the above image picture feature amount, other examples include "motion strength (motion intensity)," and "spatial distribution or time distribution of motion intensity" in the moving picture image. In order to determine the scene feature amount associated with such motion based on the moving picture image data, a motion vector indicating how a moving picture image signal moves among frames is first obtained based on a plurality of frame data, and the scene feature amount is then calculated based on the motion vector information thus obtained.

Figure 5:
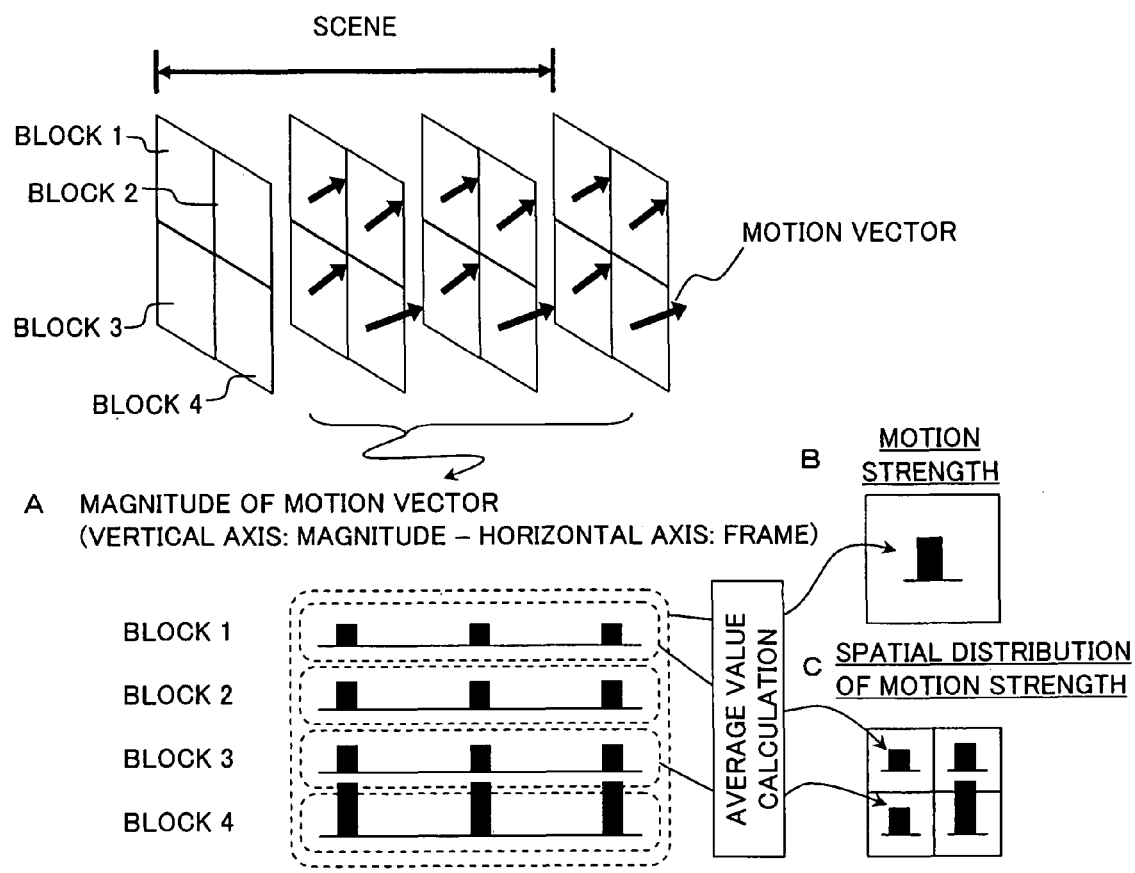
FIG. 5 shows a determination method for determining motion strength and the spatial distribution of the motion strength as scene feature amounts.

FIG. 5 shows a diagram in which the motion strength and the spatial distribution of the motion intensity of a scene are determined by dividing each of the frames contained in the scene into four blocks, blocks 1 to 4, and by determining a motion vector for each of the blocks 1 to 4. The motion vector provided in each of the blocks is a vector representation indicating where each of the moving picture image signals constituting the relevant block was located in the previous frame; that is, the distance from the previous frame. Thus, in FIG. 5, the first frame of the scene is provided with no motion vectors. The motion strength and the spatial distribution of the motion strength are obtained by determining the magnitude of each motion vector provided in each block (FIG. 5A) and calculating the average value of the whole scene (motion strength, FIG. 5B) or the average value of each spatial position (spatial distribution of motion strength, FIG. 5C).

While, in FIG. 5, the number of blocks for which motion vectors are determined and the number of divisions obtained when the spatial distribution of the motion strength is obtained are the same (four having two rows and two columns), the numbers are not necessarily the same; a plurality of blocks may collectively be considered to be one spatial position so as to determine the spatial distribution of the motion strength. For example, in the case of a moving picture image divided into 16 blocks of 4×4, the spatial distribution of the motion strength can be determined by dividing it into pairs each having four blocks of 2×2, and setting four divided positions of 2×2.

In cases in which the moving picture image data is compression coded data coded by an inter-frame predictive coding system, such as MPEG, the scene feature amount associated with the above motion can be directly calculated using motion vector information contained in the moving picture image coded data.

In contrast, in order to determine a scene feature amount associated with a color signal based on the moving picture image coded data, the moving picture image may need to be decoded first, so as to calculate the scene feature amount. Other examples of the scene feature amount that can be indirectly obtained based on the moving picture image data include "edge distribution" in which rapidly changing signal component portions are captured. For example, a picture image feature amount for each frame that is also used in a conventional technology may be converted in accordance with the following formula, and it is then used as the scene feature amount $x_i$ corresponding to the scene i.

$$x_i = \frac{1}{N_1} \sum_{j=0}^{j<N_1} x_{i,j} \qquad \text{Formula 2}$$

In Formula 2, $x_{i,j}$ denotes a picture image feature amount in cases in which the frames j: j=0, ..., $N_1$−1 constitute the scene i. Note that the method for calculating the scene feature amount of the scene i based on the picture image feature amount for each frame is not limited to the method with Formula 2; for example, a maximum value or a median value of the picture image feature amount for each of the frames constituting the scene i may be used as the scene feature amount $x_i$ representing the scene i. The picture image change amount used in the following description, which is a picture image feature amount also used in conventional technology, has been converted by Formula 2 into a scene feature amount for use.

Figure 1:
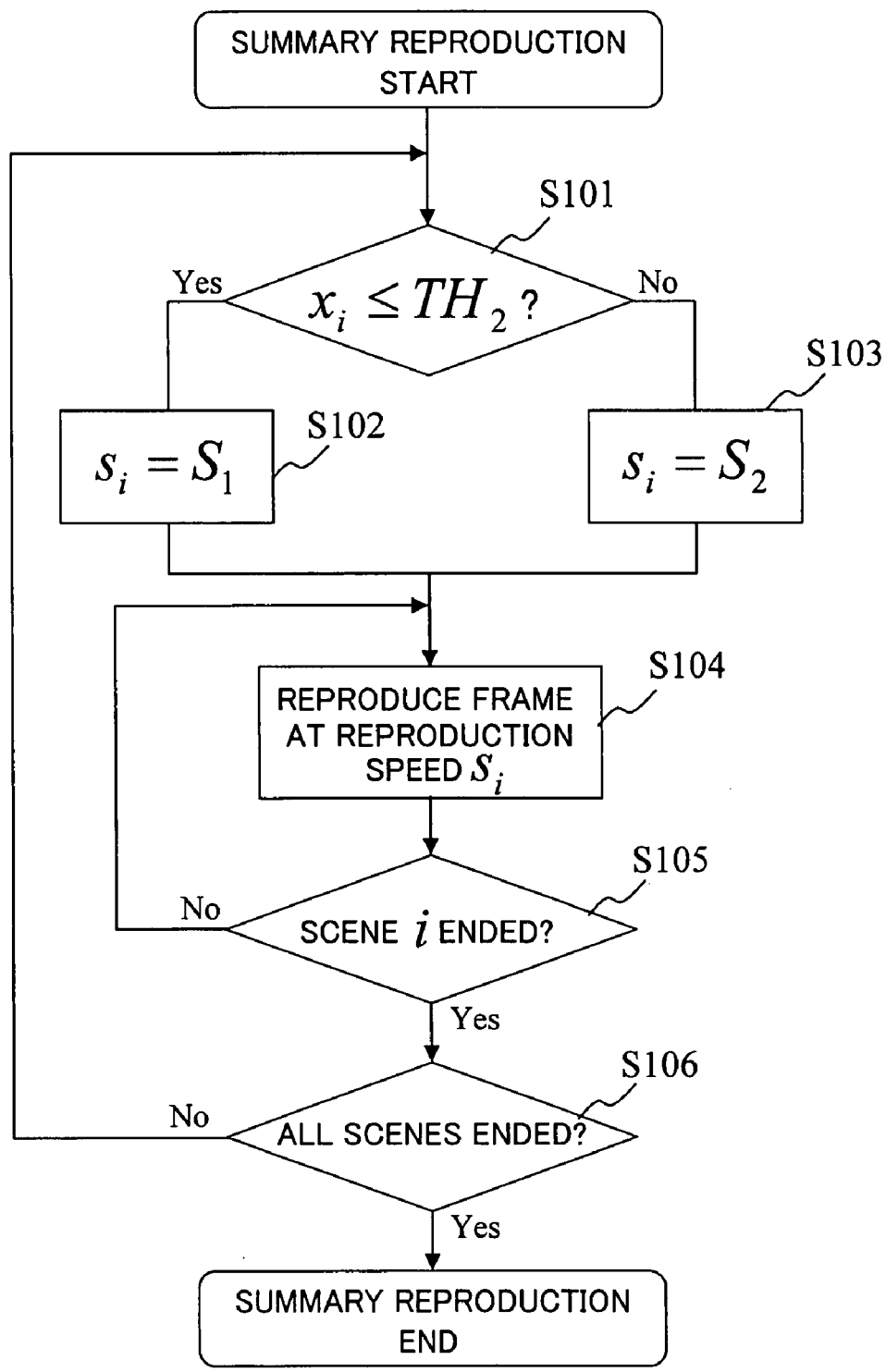
FIG. 1 shows a flowchart diagram of an example of the operation of a moving picture image reproduction apparatus according to an embodiment of the present invention.

Next, the operation of the summary reproduction of the moving picture image reproduction apparatus according to the present invention will be described with reference to FIG. 1, and FIG. 2 is also referred to as needed.

The following explanation is made where a summary reproduction (summary reproduction method 1) in which a user can easily grasp the transition of change in picture image in moving picture image data is realized by making the reproduction speed $s_i$ greater in a scene having small change in picture image and making the reproduction speed $s_i$ less in a scene having large change in picture image based on the scene feature amount $x_i$ for each scene. It is also assumed herein that the reproduction speed control unit 3 has been previously provided with instructions from the user to carry out reproduction in accordance with the summary reproduction method 1.

(Summary Reproduction Method 1)

First, in the reproduction speed control unit 3, the scene feature amount $x_i$ with respect to the scene i is compared with a predetermined threshold value $TH_2$ (step S101). If $x_i \leq TH_2$, the reproduction speed $s_i$ of the scene i is set to be $s_i = S_1$ (step S102). On the other hand, if $x_i > TH_2$, the reproduction speed $s_i$ of the scene i is set to be $s_i = S_2$ (step S103). Note that the relationship between $S_1$ and $S_2$ is $S_1 > S_2$. The reproduction speed $s_i$ may be corrected so that the fluctuation range of the reproduction speed $s_i$ is suppressed; for example, after the reproduction speed is determined in S102 or S103, using a predetermined threshold value $TH_3$, if $s_i - s_{i-1} > TH_3$, $s_i$ is corrected so that $s_i = s_{i-1} + TH_3$, and if $s_i - s_{i-1} < -TH_3$, $s_i$ is corrected so that $s_i = s_{i-1} - TH_3$.

Next, based on the determined reproduction speed $s_i$, the frame decoded in the picture image decoding unit 1 is displayed on the reproduction unit 2 (step S104), the step S104 is repeated for all the frames in the scene i (step S105), and the above steps S101 to S105 are repeated for all the scenes (step S106).

Generally, when the relationship between $s_i$ and $x_i$ is represented by $s_i = f(x_i)$, it is only necessary that the structure of the summary reproduction method 1 according to the present embodiment satisfies $f(X_0) \geq f(X_1)$, where arbitrary $X_0$, $X_1$: $X_0 < X_1$. For example, as shown in FIG. 6(a), the reproduction speed may be changed at multiple stages using a plurality of threshold values. Alternatively, as shown in FIG. 6(b), $s_i$ may be smoothly changed depending on $x_i$. Further, as shown in FIG. 6(c), by using two functions satisfying $f_2(x_i) < f_1(x_i)$, in the section $X_0 < x_i < X_1$, $s_i$ may be determined under different conditions as below in accordance with $x_{i-1}$ and $s_{i-1}$ in the scene i−1:

1) $s_i = f_1(x_i)$ is set if $x_{i-1} < X_0$ and $x_i \geq X_0$
2) $s_i = f_2(x_i)$ is set if $x_{i-1} > X_1$ and $x_i \leq X_1$
3) other than the above 1) and 2),
   3-1) $s_i = f_1(x_i)$ is set if $s_{i-1} = f_1(x_{i-1})$
   3-2) $s_i = f_2(x_i)$ is set if $s_{i-1} = f_2(x_{i-1})$.

In the example shown in FIG. 6(c), by changing the condition for determining the reproduction speed $s_i$ as described above, it becomes possible to suppress the fluctuation of the reproduction speed $s_i$ with respect to a minute change of the scene feature amount $x_i$.

As described above, in accordance with the summary reproduction method 1, the reproduction speed $s_i$ is made greater in a scene having small change in picture image and the reproduction speed $s_i$ is made less in a scene having large change in picture image. For example, in the case of moving picture image data composed of scenes having generally large change in picture image, such as hits or home runs in a broadcast of a baseball game, which are important to grasp the outline of the moving picture image data, it is possible to carry out a summary reproduction that emphasizes the scenes.

Next, a summary reproduction method (summary reproduction method 2) that exerts control so that a scene having a small picture image change amount is reproduced at a low speed and a scene having a large picture image change amount is reproduced at a high speed, which is different from the above summary reproduction method 1, will be described.

(Summary Reproduction Method 2)

Figure 7:
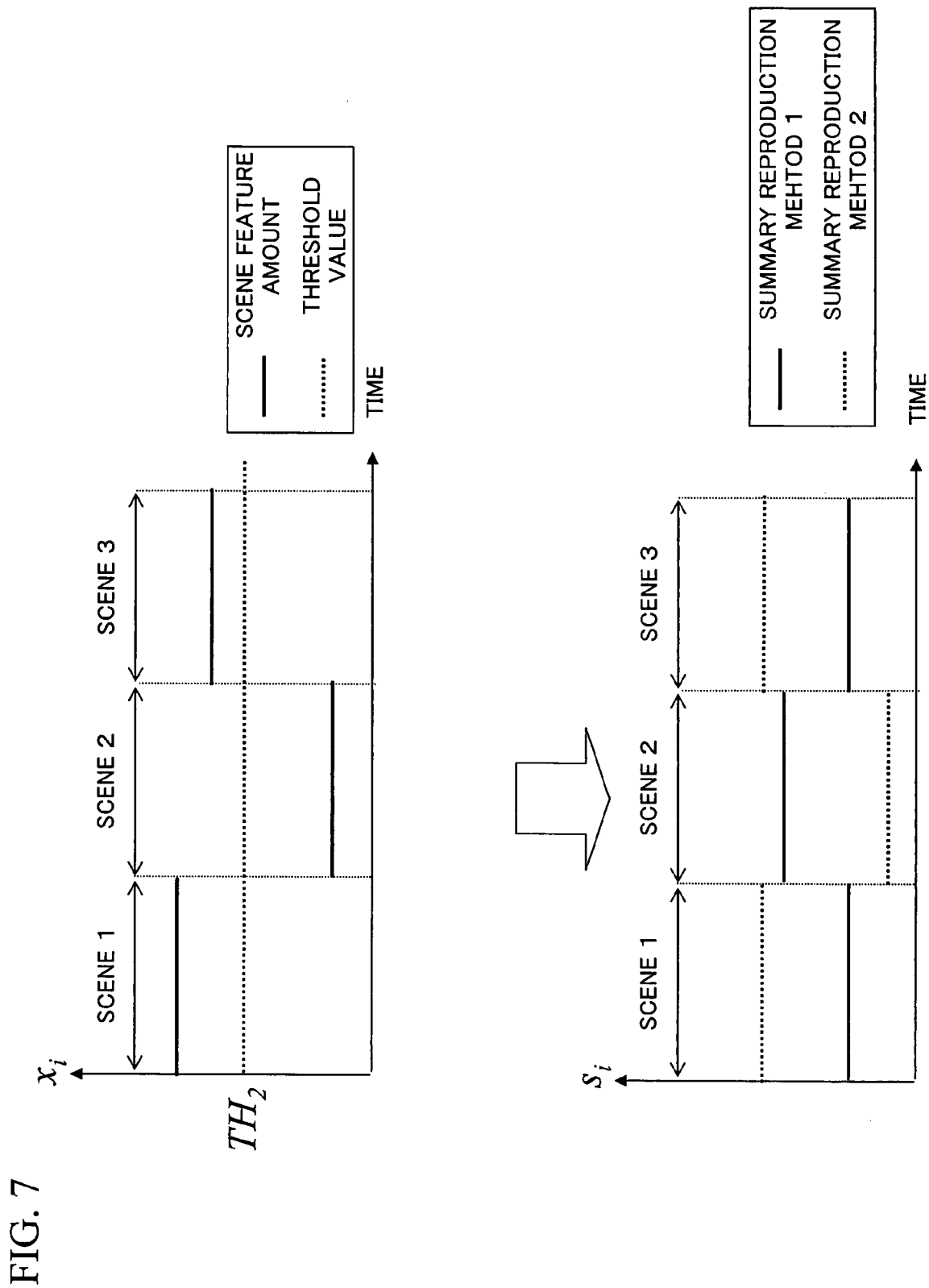
FIG. 7 shows the difference between the summary reproduction method 1 and a summary reproduction method 2 in terms of reproduction characteristics.

The summary reproduction method 2 of the present invention can be realized based on a structure that satisfies $f(X_0) \leq f(X_1)$, when the relationship between $s_i$ and $x_i$ is represented by $s_i = f(x_i)$ and arbitrary $X_0$, $X_1$: $X_0 < X_1$. Thus, a simple method for realizing the summary reproduction method 2 is to change the relationship concerning the reproduction speed in steps S102 and S103 in the above FIG. 1, so that the relationship becomes $S_1 < S_2$. In this case, as the examples shown in FIG. 7 clearly show, scenes reproduced at a high speed in accordance with the summary reproduction method 1 are reproduced at a low speed in accordance with the summary reproduction method 2, and scenes reproduced at a low speed in accordance with the summary reproduction method 1 are reproduced at a high speed in accordance with the summary reproduction method 2. Namely, the reproduction characteristics of the summary reproduction method 2 are different from those of the summary reproduction method 1.

Figure 6:
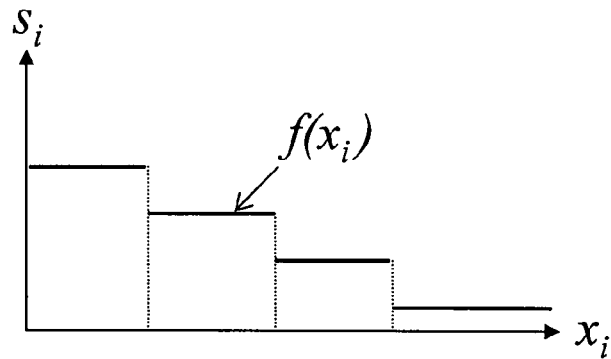
FIG. 6 shows the relationship between a reproduction speed $s_i$ and a scene feature amount $x_i$ based on a summary reproduction method 1.
Figure 6:
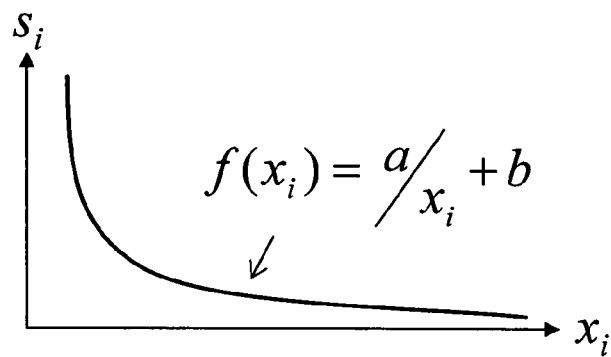
Figure 6:
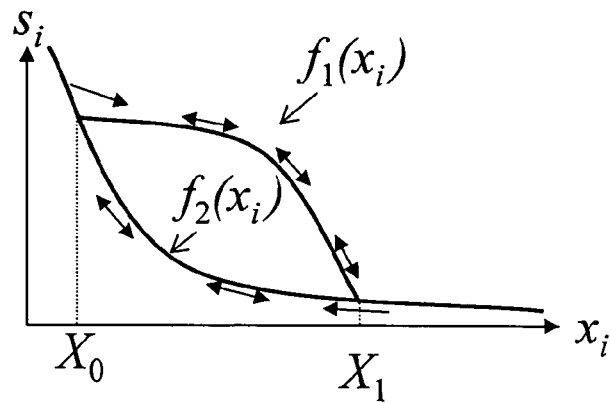
Figure 8:
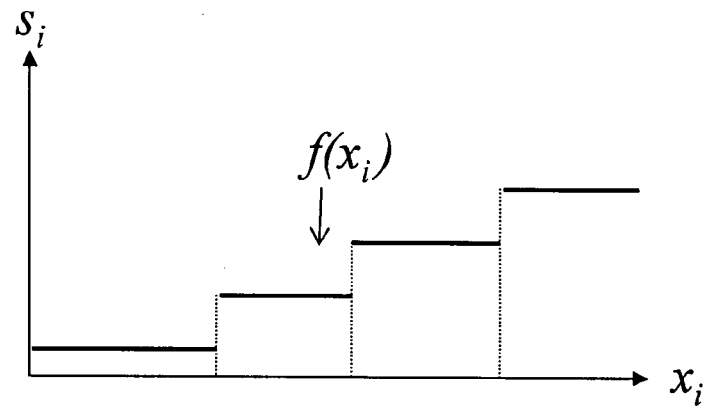
FIG. 8 shows the relationship between the reproduction speed $s_i$ and the scene feature amount $x_i$ based on the summary reproduction method 2.
Figure 8:
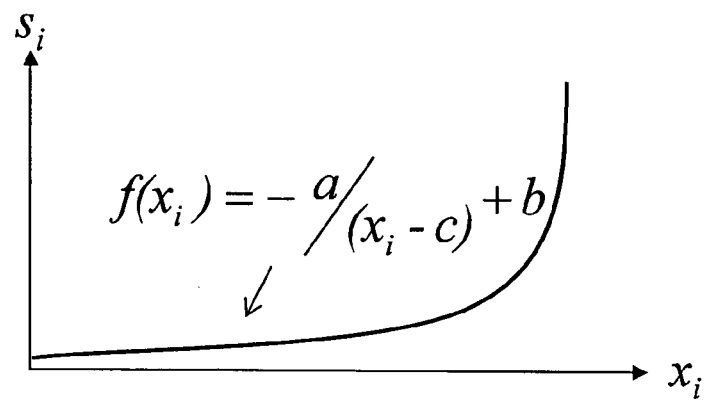
Figure 8:
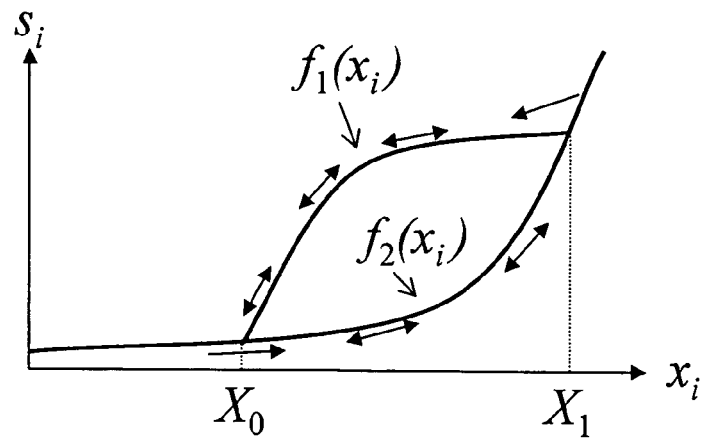

As in the examples shown in FIG. 6 in accordance with the summary reproduction method 1, the reproduction speed may be changed at multiple states using a plurality of threshold values shown in FIG. 8(a). Furthermore, $s_i$ may be smoothly changed depending on $x_i$ shown in FIG. 8(b). As another alternative, the present method can be realized with the structure in which $s_i$ is determined under different conditions as below in the section $X_0 < x_i < X_1$ shown in FIG. 8(c), using two functions having the relationship $f_2(x_i) < f_1(x_i)$, in accordance with $x_{i-1}$ and $s_{i-1}$ in a scene i−1:

1) $s_i = f_2(x_i)$ is set if $x_{i-1} < X_0$ and $x_i \leq X_0$
2) $s_i = f_1(x_i)$ is set if $x_{i-1} > X_1$ and $x_i \leq X_1$
3) other than the above 1) and 2)
   3-1) $s_i = f_1(x_i)$ is set if $s_{i-1} = f_1(x_{i-1})$
   3-2) $s_i = f_2(x_i)$ is set if $s_{i-1} = f_2(x_{i-1})$ In the example shown in FIG. 8(c), by changing the condition for determining the reproduction speed $s_i$ as described above, it becomes possible to suppress the fluctuation of the reproduction speed $s_i$ with respect to a minute change of the scene feature amount $x_i$.

As described above, the summary reproduction method 2 reproduces a scene having a large picture image change amount at a high speed and it reproduces a scene having a small picture image change amount at a low speed. In this way, in the case of moving picture image data composed of scenes having generally small change in picture image, such as conversations between characters in a drama, which are important to grasp the outline of the moving picture image data, it is possible to carry out a summary reproduction that emphasizes the scenes.

Further, the summary reproduction method is not limited to the above summary reproduction method 1 or 2, for example, by allowing the reproduction speed control unit 3 to set the reproduction speed to be $S_1 = \infty$ and $S_2 = 1$ in the steps S102 and S103 in FIG. 1, it becomes possible to realize a digest reproduction in which main scenes alone in moving picture image data are reproduced by reproducing scenes having a large picture image change amount at normal speed and skipping the reproduction of scenes having a small picture image change amount.

As described above, based on the moving picture image reproduction apparatus according to the present embodiment, a plurality of summary reproduction methods having different reproduction characteristics based on a scene feature amount for each scene are provided, and the number $N_1$ of frames that constitute a scene is appropriately determined in advance by experiment or the like, whereby significant change in reproduction speed in a short period of time can be avoided.

While a picture image change amount (difference between frames) is used as a scene feature amount in the above explanation, generally, when the picture image change amount is large, motion becomes great (large motion strength) and a code amount caused in moving picture image coded data also becomes large. When a picture image change amount is small, motion is very little (small motion strength). Further since the code amount caused in moving picture image coded data is also caused to be small, the same effect can be obtained even when the motion strength or the code amount that the scene i occupies in the moving picture image coded data is used as a scene feature amount.

Further, the scene feature amount that can be used in the moving picture image reproduction apparatus according to the present embodiment is not limited to the above examples. For example, in cases in which a representative color in the scene i is used as the scene feature amount $x_i$, by exerting control so that a scene in which the difference between the representative color and a predetermined color is small is reproduced at a low speed and a scene in which the difference between the representative color and a predetermined color is large is reproduced at a high speed, for example, when the representative color is flesh color, it becomes possible to realize a summary reproduction emphasizing only a close-up scene of a person in the moving picture image data. Similarly, by setting a predetermined picture image change amount or motion strength, it is possible to carry out the summary reproduction in which a scene having a picture image change amount or a motion strength close to the set value is reproduced at a low speed and a picture image change amount or a motion strength away from the value is reproduced at a high speed.

Alternatively, the scene feature amount of audio data associated with the moving picture image data may be used as the scene feature amount $x_i$. For example, an average sound volume in the scene i is used as the scene feature amount $x_i$, so as to exert control such that a scene having an average sound volume greater than a predetermined value is reproduced at a low speed and a scene having an average volume sound less than the predetermined value is reproduced at a high speed. In this way, for example, in the case of moving picture image data concerning a broadcast of a soccer game, since the sound volume tends to be greater in important scenes such as goal scenes than normal scenes due to the influence of cheers of the audience, it becomes possible to carry out a summary reproduction emphasizing the important scenes.

Further, when M kinds of scene feature amount in the scene i; that is, $x'_{i,j}$: $j=0, \ldots, M-1$, exists, by carrying out the feature amount conversion indicated by the following Formula, it can be handled as a single synthetic feature amount $x_i$.

$$x_i = \sum_{j=0}^{j \leq M} w_j x'_{i,j} \qquad \text{Formula 3}$$

In Formula 3, $W_j$ denotes a weighting factor that differs depending on the kind of feature amount, and an optimum value thereof is determined in advance by experiment or the like. Regarding the conversion with Formula 3, a previously converted synthetic feature amount $x_i$ may be recorded in an external memory unit. Alternatively, the conversion may be carried out in the reproduction speed control unit 3.

As described above, based on the moving picture image reproduction apparatus according to the present embodiment, a plurality of scene feature amounts are used, and therefore, it is advantageous in that a summary reproduction can be realized in accordance with more complicated user needs.

Next, a moving picture image reproduction apparatus according to a second embodiment of the present invention will be described with reference to the drawings. Since the moving picture image reproduction apparatus according to the present embodiment is similar to the structure of FIG. 2 according to the first embodiment, the description thereof will be omitted. However, the moving picture image reproduction apparatus according to the present embodiment differs from the moving picture image reproduction apparatus according to the first embodiment in terms of the operation of the reproduction speed control means 3 (FIG. 2).

Figure 9:
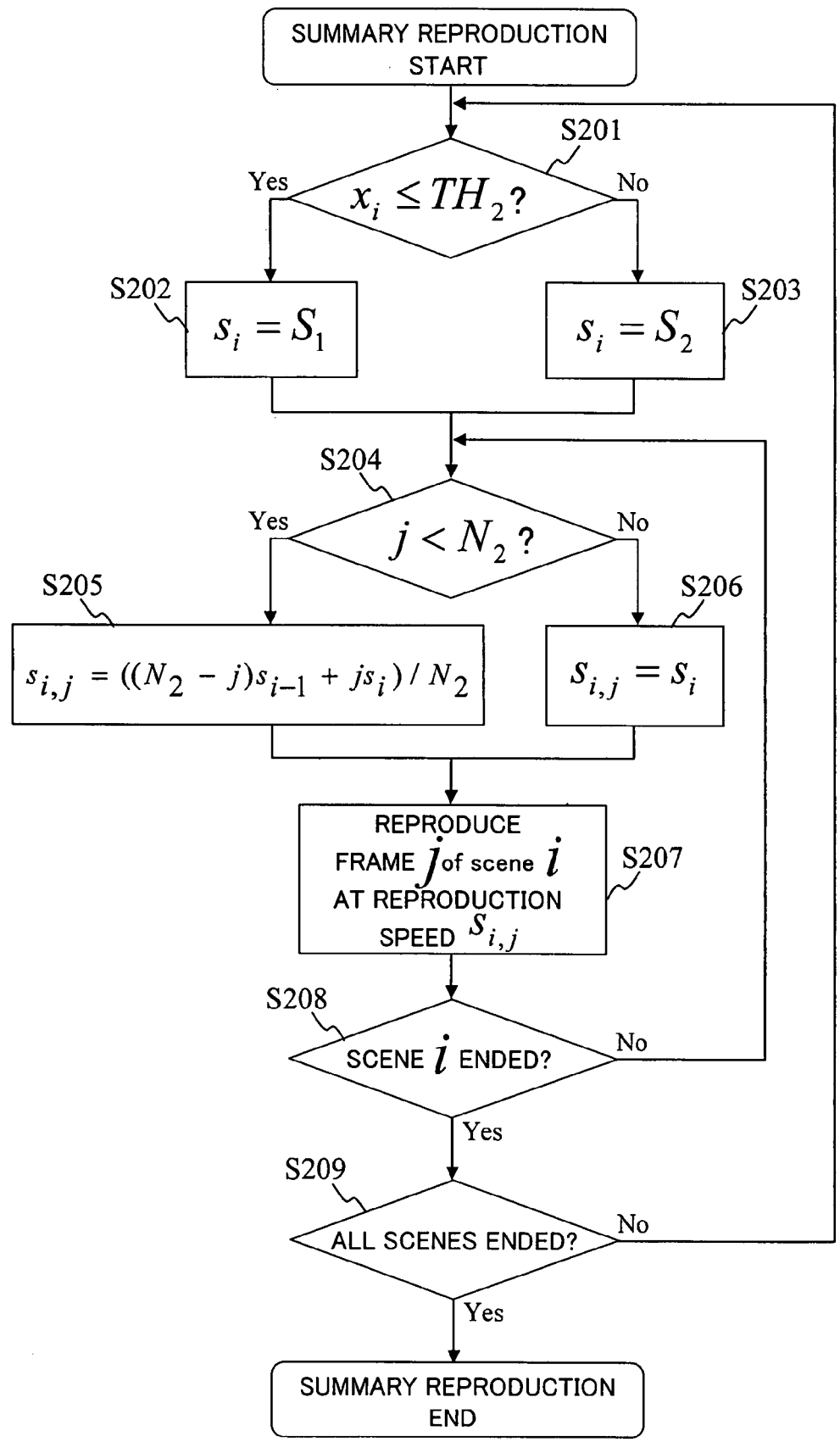
FIG. 9 shows a flowchart diagram of the flow of the operation of a moving picture image reproduction apparatus according to a second embodiment of the present invention.

Next, the flow of the summary reproduction operation of the moving picture image reproduction apparatus according to the present embodiment will be described with reference to FIG. 9. Only a method for realizing the summary reproduction method 1 according to the first embodiment will be described in the following. However, other summary reproductions (summary reproduction method 2 and the like) can also be realized, while the description thereof will be omitted.

In the reproduction speed control unit 3 according to the present embodiment, the scene feature amount $x_i$ with respect to the scene i is compared with a predetermined threshold value $TH_2$ (step S201). If 1) $x_i \leq TH_2$, the target reproduction speed $s_i$ of the scene i is set to be $s_i = S_1$ (step S202). If 2) $x_i > TH_2$, the target reproduction speed $s_i$ of the scene i is set to be $s_i = S_2$ (step S203). Note that $S_1 > S_2$. Next, in the reproduction speed control unit 3, the reproduction speed of each of the frames j: j=0, ..., $N_1-1$ that constitute the scene i is compared with a predetermined threshold value $N_2$: $N_2 < N_1$ (step S204). If $j < N_2$, the reproduction speed $s_{i,j}$ of the frame j is set to be $s_{i,j} = (N_2-j)s_{i-1}/N_2 + js_i/N_2$ (step S205). On the other hand, if $j \geq N_2$, the reproduction speed $s_{i,j}$ of the frame j is set to be $s_{i,j} = s_i$ (step S206).

Next, in accordance with the determined reproduction speed $s_{i,j}$, the frame decoded in the picture image decoding unit 1 is displayed on the reproduction unit 2 (step S207), the steps S204 to S207 are repeated with respect to all the frames in the scene i (step S208), and the above steps S201 to S208 are repeated with respect to all the scenes (step S209).

While a method for selecting one of $S_1$ and $S_2$ for the target reproduction speed $s_i$ has been described in the above description, the present invention is not limited to such method. As in the case of the first embodiment, it may be structured so that the reproduction speed can be changed as shown in FIG. 6.

Further, the reproduction speed $s_{i,j}$ of each of the frames j that constitute the scene i is not limited to the method indicated by the steps S204 to S206. The reproduction speed $s_{i,j}$ can be determined by any method as long as the reproduction speed of the frame comprising the scene i is changed from $s_{i-1}$ to $s_i$ in stages.

Figure 10:
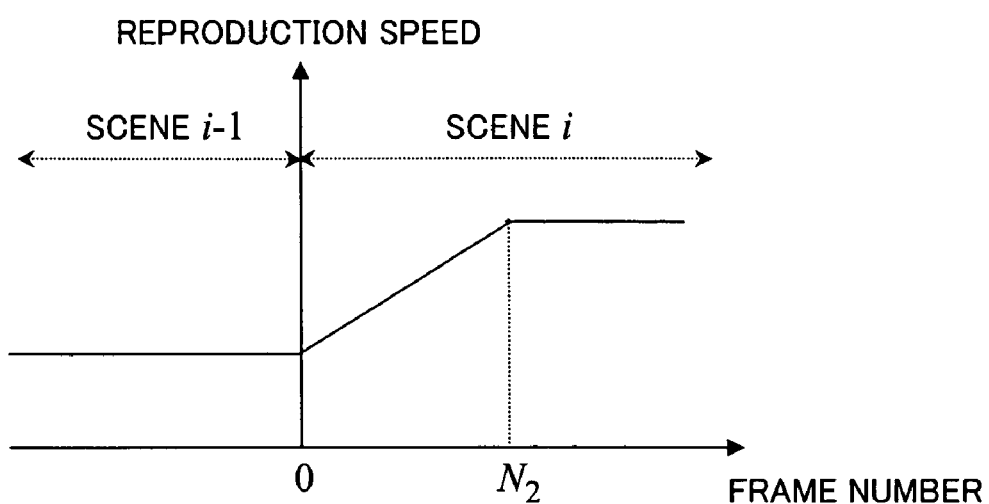
FIG. 10 shows an explanatory diagram of change in reproduction speed according to the second embodiment of the present invention.

As described above, based on the moving picture image reproduction apparatus according to the present embodiment, the target reproduction speed is determined for each scene, and the reproduction speed is changed for each frame comprising the scene. Thus, as an example of FIG. 10 shows, the reproduction speed between scenes is smoothly changed, whereby significant change in reproduction speed can be avoided.

Next, a moving picture image reproduction apparatus according to a third embodiment of the present invention will be described with reference to the drawings. Since the structure of the moving picture image reproduction apparatus according to the present embodiment is similar to that of the first embodiment (FIG. 2), the description thereof will be omitted herein. However, the moving picture image reproduction apparatus according to the present embodiment differs from the moving picture image reproduction apparatus according to the first and second embodiments in that the picture image feature amount $x_i$ for each frame is used as an input in the operation of the reproduction speed control means 3.

As in the case of the scene feature amount for each frame according to the first and second embodiments, the picture image feature amount $x_i$ for each frame used in the present embodiment is not limited to the picture image change amount (difference between frames); for example, the code amount or the magnitude of the motion vector in the frame i in the moving picture image coded data can be used.

Figure 11:
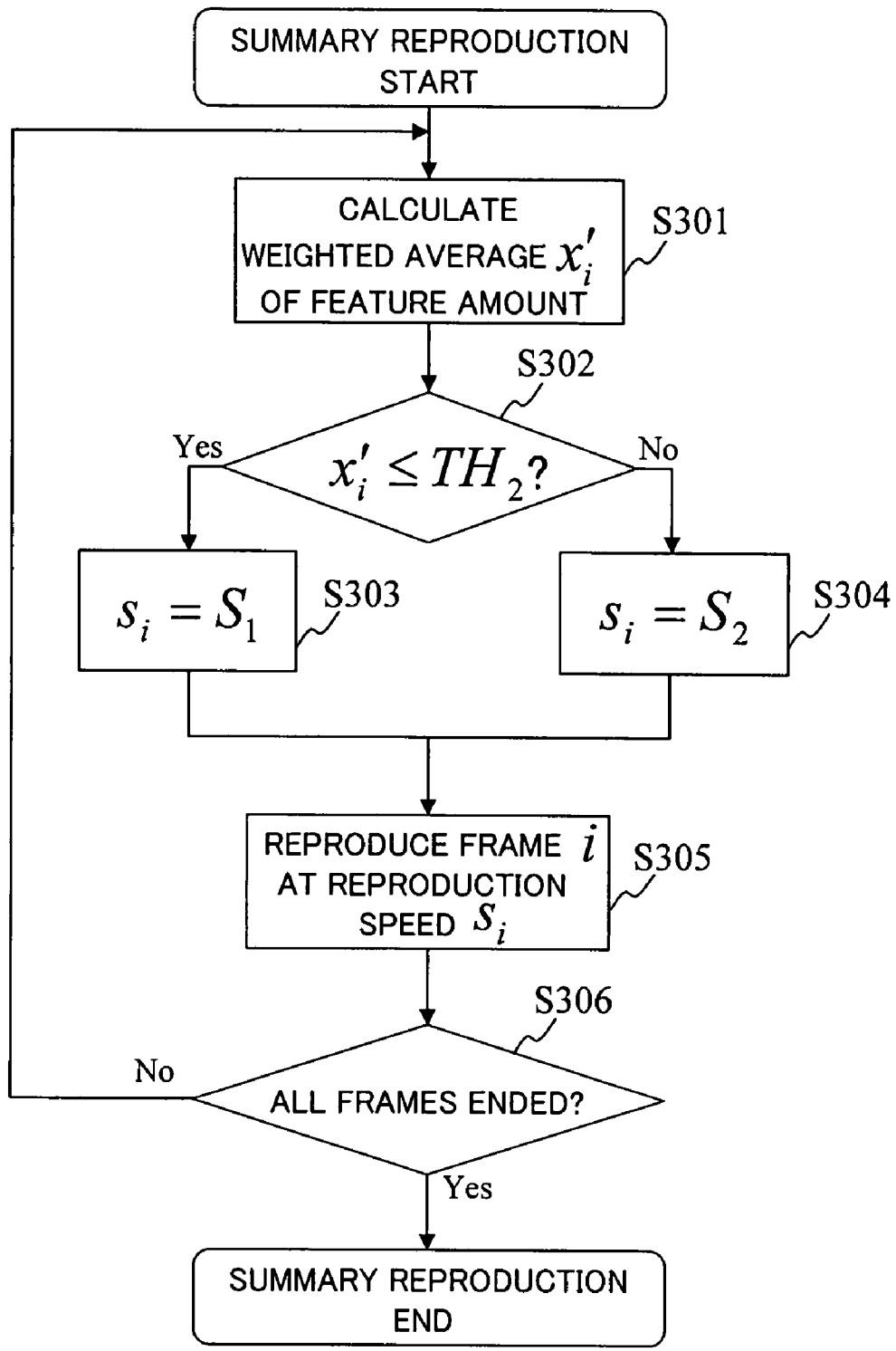
FIG. 11 shows a flowchart diagram of the flow of the operation of a moving picture image generation apparatus according to a third embodiment of the present invention.
Figure 12:
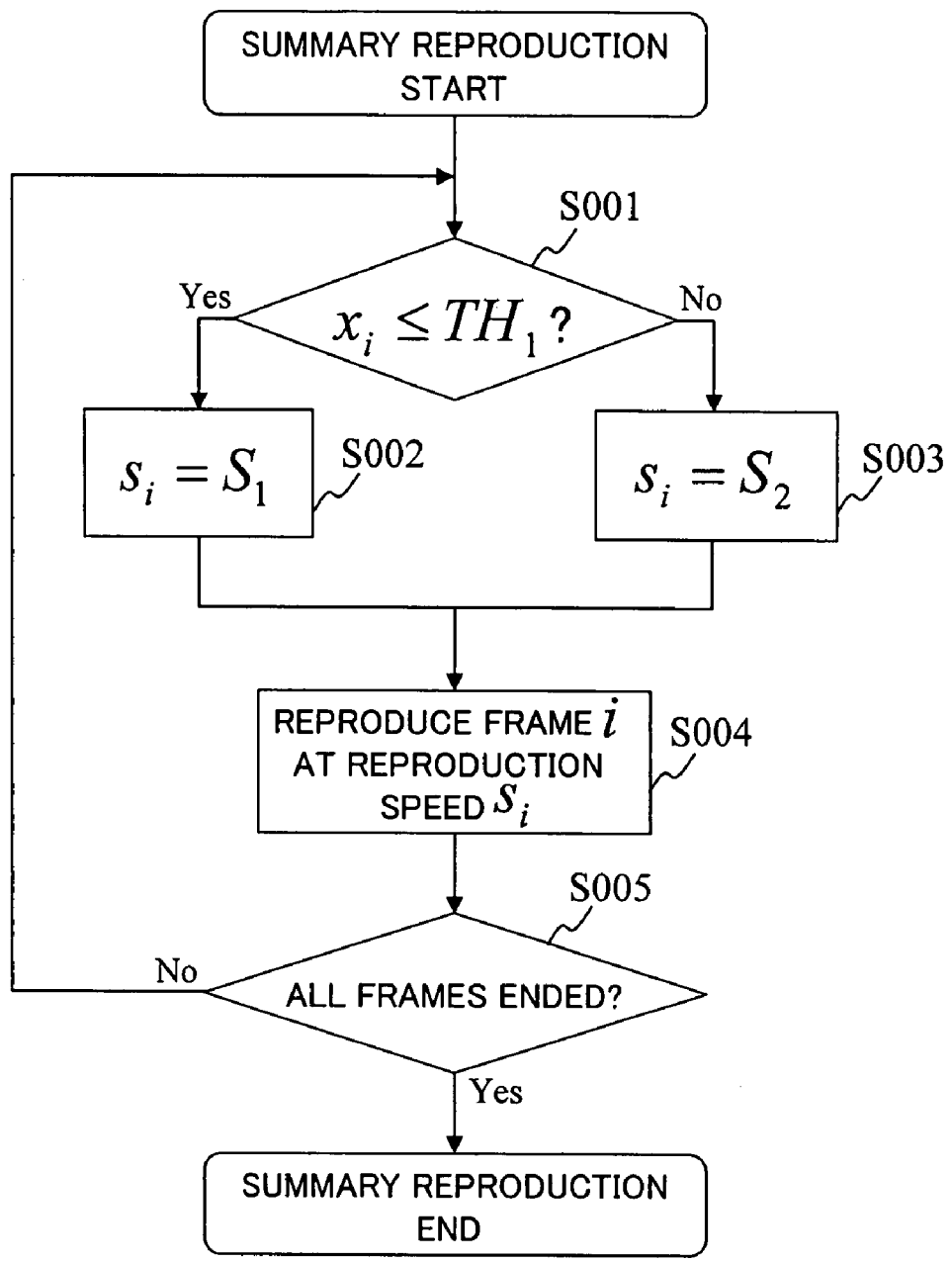
FIG. 12 shows a flowchart diagram of the flow of the operation of a moving picture image reproduction apparatus according to a conventional technology.

Next, the operation of the summary reproduction based on the moving picture image reproduction apparatus according to the present embodiment will be described with reference to FIG. 11. While only a method for realizing the above summary reproduction method 1 will be described in the following description, it is also possible to realize other summary reproductions (summary reproduction method 2 and the like).

First, in the reproduction speed control unit 3, as shown in the following Formula, a weighted average $x'_i$ of the scene feature amount $x_i$ in the frame i and a predetermined number $N_3$ of frames before the frame i is determined (step S301).

$$x'_i = \frac{1}{N_3} \sum_{j=0}^{j<N_3} W'_j x_{i-j} \qquad \text{Formula 4}$$

In Formula 4, $W_j'$ represents a predetermined weighting factor with respect to the frame$_{i-j}$ and it is determined in advance by experiment or the like. The weighted average may be determined with respect to $N_3$ frames closest to the frame i as the weighted average $x'_i$. Alternatively, a maximum value or a median value of the picture image feature amount of the predetermined frame number $N_3$ before the frame i may be determined and used, instead of the weighted average $x'_i$.

Next, in the reproduction speed control unit 3, the picture image feature amount $x_i$ with respect to the frame i is compared with a predetermined threshold value $TH_2$ (step S302). If $x'_i \leq TH_2$, the reproduction speed $s_i$ of the frame i is set to be $s_i = S_1$ (step S303). On the other hand, if $x'_i > TH_2$, the reproduction speed $s_i$ of the frame i is set to be $s_i = S_2$ (step S304). Note that the relationship between $S_1$ and $S_2$ is $S_1 > S_2$.

Next, in accordance with the determined reproduction speed $s_i$, the frame decoded in the picture image decoding unit 1 is displayed on the reproduction unit 2 (reproduction: step S305), and the above steps from S301 to S305 are repeated with respect to all the frames (step S306).

While a method for selecting one of $S_1$ and $S_2$ for the target reproduction speed $s_i$ has been described in the above description, the present embodiment is not limited to such method. As in the case of the first embodiment, $x_i$ as shown in FIG. 6 may be replaced by $x'_i$. Further, based on the moving picture image reproduction apparatus according to the present embodiment, since the reproduction speed is controlled for each frame, the reproduction speed $s_i$ is easily influenced by the change of $x'_i$. Thus, by using the structure as shown in FIG. 6(c), it becomes possible to further suppress change in reproduction speed between frames.

As described above, based on the moving picture image reproduction apparatus according to the present embodiment, since the reproduction speed is determined based on the weighted average of the picture image feature amount $x_i$ for each frame, the reproduction speed $s_i$ is caused to be greater in a scene having a high percentage of frames having small change in picture image and the reproduction speed $s_i$ is caused to be lower in a scene having a high percentage of frames having large change in picture image, while suppressing the influence of the change of the picture image feature amount $x_i$ between frames. Thus, it is possible to provide a summary reproduction technology by which the user can easily grasp the outline of moving picture image.

INDUSTRIAL APPLICABILITY

The present invention can be used for a moving picture image reproduction apparatus capable of reproducing the summary of moving picture image data.

The invention claimed is:

1. A moving picture image reproduction apparatus comprising:
    means for determining a feature amount in each of a plurality of predetermined continuous units associated with moving picture image data;
    means for evaluating a value of the feature amount in each of the plurality of predetermined continuous units under a plurality of reproduction speed control conditions to select a function for the feature amount in each of the plurality of predetermined continuous units; and
means for using the function to determine a reproduction speed for each of the predetermined continuous units associated with the moving picture data,
    wherein the feature amount is determined by extraction from the moving picture image data,
    wherein the plurality of predetermined continuous units corresponds to a predetermined number of frames in the moving picture image data,
    wherein a summary of moving picture image data is reproduced,
    further comprising means for determining a target reproduction speed for each scene and changing the reproduction speed, wherein, based on a first target reproduction speed of a first scene and a second target reproduction speed of a second scene adjacent to the first scene, the means determines the reproduction speed of each of the frames that constitute the first scene, so that the reproduction speed is smoothly changed between two continuous scenes.

2. The moving picture image reproduction apparatus according to claim 1, wherein each of the predetermined continuous units associated with the moving picture data corresponds to a frame.

3. A moving picture image reproduction apparatus, comprising:
    means for determining a feature amount in each of a plurality of predetermined continuous units associated with the moving picture image data;
    means for evaluating a value of the feature amount in each of the plurality of predetermined continuous units under a plurality of reproduction speed control conditions to select a function for the feature amount in each of the plurality of predetermined continuous units;
    means for using the function to determine a reproduction speed for each of the predetermined continuous units associated with the moving picture data; and
    reproduction speed changing means for determining a target reproduction speed for each scene and changing the reproduction speed for each of the frames that constitute the scene,
    wherein, based on a first target reproduction speed of a first scene and a second target reproduction speed of a second scene adjacent to the first scene, the reproduction speed changing means determines the reproduction speed of each of the frames that constitute the first scene, so that the reproduction speed is smoothly changed between two continuous scenes.

4. The moving picture image reproduction apparatus according to claim 3, wherein the feature amount is determined by extraction from the moving picture image data.

5. The moving picture image reproduction apparatus according to claim 3, wherein the plurality of predetermined continuous units corresponds to a predetermined number of frames in the moving picture image data.

6. The moving picture image reproduction apparatus according to any one of claims 3 to 5, wherein a summary of moving picture image data is reproduced.

* * * * *